(12) United States Patent
Matsumoto et al.

(10) Patent No.: US 7,238,743 B2
(45) Date of Patent: Jul. 3, 2007

(54) PRODUCTION PROCESS FOR WATER-ABSORBENT RESIN

(75) Inventors: Yukihiro Matsumoto, Kobe (JP); Kunihiko Ishizaki, Suita (JP); Teruyuki Kanto, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 192 days.

(21) Appl. No.: 11/143,628

(22) Filed: Jun. 3, 2005

(65) Prior Publication Data
US 2005/0228154 A1 Oct. 13, 2005

Related U.S. Application Data

(62) Division of application No. 09/883,266, filed on Jun. 19, 2001, now Pat. No. 6,927,268.

(30) Foreign Application Priority Data
Jun. 21, 2000 (JP) ............................. 2000-187021

(51) Int. Cl.
  *C08F 20/06* (2006.01)
(52) U.S. Cl. ............... 524/556; 526/77; 526/317.1; 526/318.5
(58) Field of Classification Search ............ 524/556; 526/77, 317.1, 318.5
  See application file for complete search history.

(56) References Cited

U.S. PATENT DOCUMENTS

| | | | |
|---|---|---|---|
| 3,725,208 A | 4/1973 | Maezawa et al. | 203/8 |
| 4,654,039 A | 3/1987 | Brandt et al. | 604/368 |
| 5,338,810 A | 8/1994 | Shimomura et al. | 526/75 |
| 5,380,808 A | 1/1995 | Sumiya et al. | 526/317.1 |
| 5,562,646 A | 10/1996 | Goldman et al. | 604/368 |
| 5,574,121 A | 11/1996 | Irie et al. | 526/318.44 |
| 5,746,892 A | 5/1998 | Bauer et al. | 203/38 |
| 5,759,358 A | 6/1998 | Bauer, Jr. et al. | |
| 5,981,070 A | 11/1999 | Ishizaki et al. | 428/403 |
| 6,071,976 A | 6/2000 | Dairoku et al. | 521/50 |
| 6,187,872 B1 | 2/2001 | Yanase et al. | 525/330.2 |
| 6,207,772 B1 | 3/2001 | Hatsuda et al. | 526/88 |
| 6,444,744 B1 | 9/2002 | Fujimaru et al. | 524/556 |
| 7,009,010 B2 * | 3/2006 | Kanto et al. | 526/77 |
| 7,049,366 B2 * | 5/2006 | Nakahara et al. | 524/556 |

FOREIGN PATENT DOCUMENTS

EP    0372706    6/1990

(Continued)

*Primary Examiner*—Helen L. Pezzuto
(74) *Attorney, Agent, or Firm*—Roylance, Abrams, Berdo & Goodman, L.L.P.

(57) ABSTRACT

The present invention provides a process for producing a water-absorbent resin of which the residual monomer content and the extractable content are low. The process for producing a water-absorbent resin comprises the step of polymerizing at least one monomer component including acrylic acid and/or its salt as major components to produce a water-absorbent resin that is a neutralized salt, and this process is characterized in that the acrylic acid is a product obtained by catalytic gas phase oxidation of propylene and/or propane and has a protoanemonin content of not more than 10 ppm, and in that the resultant water-absorbent resin has a neutralization ratio of not less than 50 mol %.

15 Claims, 1 Drawing Sheet

FOREIGN PATENT DOCUMENTS

| | | |
|---|---|---|
| EP | 0567207 | 10/1993 |
| EP | 0574260 | 12/1993 |
| EP | 0625501 | 11/1994 |
| EP | 0885917 | 12/1998 |
| EP | 0942014 | 9/1999 |
| GB | 1226141 | 3/1971 |
| GB | 2285046 | 6/1995 |
| JP | 466515 | 12/1971 |
| JP | 5137978 | 3/1976 |
| JP | 5137979 | 3/1976 |
| JP | 5641614 | 6/1981 |
| JP | 5993027 | 5/1984 |
| JP | 6054295 | 11/1985 |
| JP | 61218556 | 9/1986 |
| JP | 6254751 | 3/1987 |
| JP | 3031306 | 2/1991 |
| JP | 5339199 | 12/1993 |
| JP | 656931 | 3/1994 |
| JP | 6211934 | 8/1994 |
| JP | 782210 | 3/1995 |
| JP | 9124546 | 5/1997 |
| JP | 9208515 | 8/1997 |
| JP | 9227445 | 9/1997 |
| JP | 09316027 | 12/1997 |
| JP | 11217350 | 8/1999 |
| JP | 11322846 | 11/1999 |
| JP | 514077 | 10/2000 |
| JP | 2000327926 | 11/2000 |
| WO | 9801415 | 1/1998 |

\* cited by examiner

PRODUCTION PROCESS FOR WATER-ABSORBENT RESIN

This application is a divisional application of Ser. No. 09/883,266, filed Jun. 19, 2001, now U.S. Pat. No. 6,927,268.

BACKGROUND OF THE INVENTION

A. Technical Field

The present invention relates to a process for producing a water-absorbent resin of which the residual monomer content and the water-extractable content are low.

B. Background Art

Water-absorbent resins are widely utilized as absorbent articles, such as disposable diapers and sanitary napkins, by being combined with fibrous materials such as cotton, pulp, paper, and sponge.

Industrially most commonly used as the water-absorbent resins are acrylic acid-based crosslinked polymers, such as crosslinked polymers of partially neutralized poly(acrylic acids), because of their high water absorbency wherein the acrylic acid-based crosslinked polymers are obtained using acrylic acid and/or its salt as monomers (e.g. JP-A-054751/1987, JP-A-031306/1991, JP-A-211934/1994, U.S. Pat. No. 4,654,039, U.S. Pat. No. 5,338,810, U.S. Pat. No. 5,574,121, U.S. Pat. No. 5,562,646, EP 0574260 and EP 0942014).

As is mentioned above, the acrylic acid-based polymers are most commonly used because of their high water absorbency. However, their use is directed mostly to the above sanitary materials. Therefore naturally in this field the acrylic acid-based polymers are required to have no problems. The acrylic acid-based polymers are obtained by a process including the step of polymerizing at least one monomer component including acrylic acid and/or its salt as major components, and the resultant polymers contain the unreacted residue of the acrylic acid monomer although its content is very small. Therefore, the decrease of this content is required. As to the water-absorbent resin, it further needs to be water-swellable and water-insoluble, but a very small amount of water-extractable component which is a water-soluble polymer is also contained in the water-absorbent resin, and this water-extractable component has a bad influence on water absorption properties, therefore the decrease of the amount of this water-extractable component is also required. Further demanded to the water-absorbent resin are properties under a load, such as water absorption capacity under a load and liquid permeation quantity under a load.

SUMMARY OF THE INVENTION

A. Object of the Invention

Thus, an object of the present invention is to provide a process for producing a water-absorbent resin of which the residual monomer content and the water-extractable content are low.

B. Disclosure of the Invention

A process according to the present invention for producing a water-absorbent resin, which solves the above problems, comprises the step of polymerizing at least one monomer component including acrylic acid and/or its salt as major components to produce a water-absorbent resin that is a neutralized salt, and this process is characterized in that the acrylic acid is a product obtained by catalytic gas phase oxidation of propylene and/or propane and has a protoanemonin content of not more than 10 ppm, and in that the resultant water-absorbent resin has a neutralization ratio of not less than 50 mol %.

The water-absorbent resin obtained by the above process according to the present invention can have a water absorption capacity of not less than 25 g/g under a load (of about 1.96 kPa).

Another process according to the present invention for producing a water-absorbent resin comprises the step of polymerizing at least one monomer component including acrylic acid and/or its salt as major components to produce a water-absorbent resin that is a neutralized salt, and this process is characterized in that the acrylic acid used as a raw material is a product being obtained by catalytic gas phase oxidation of propylene and/or propane and containing an aldehyde, and further characterized by further comprising the step of subjecting the raw acrylic acid to a strong-alkali treatment followed by the polymerization step.

These and other objects and the advantages of the present invention will be more fully apparent from the following detailed disclosure.

DETAILED DESCRIPTION OF THE INVENTION

Figure 1:
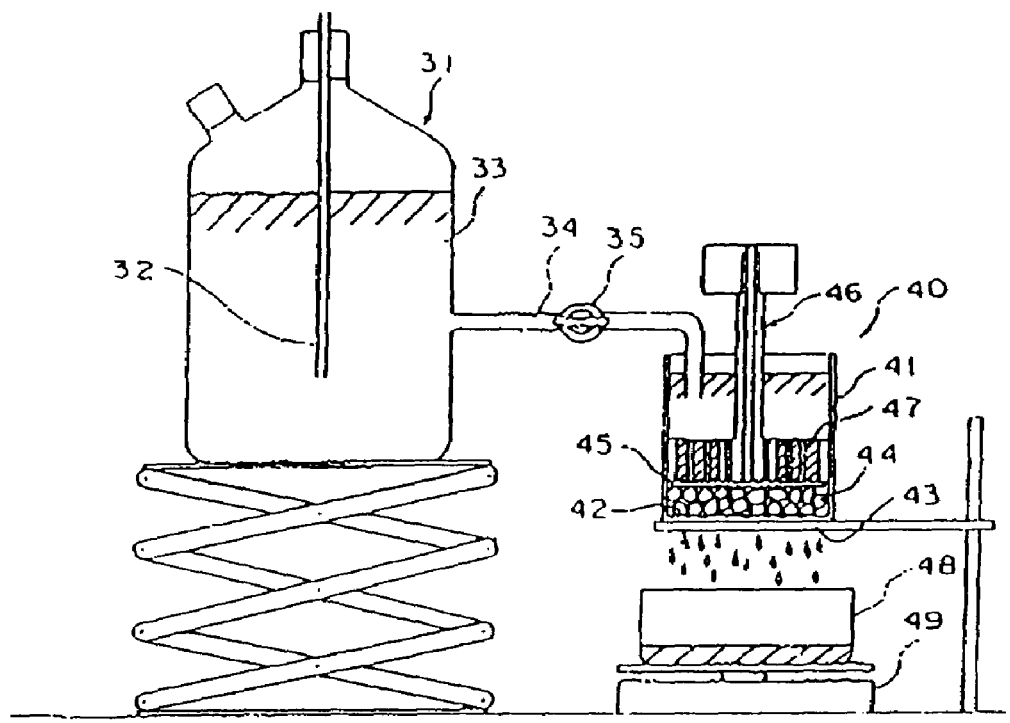
FIG. 1 is a section which illustrates a measurement apparatus for the liquid permeation quantity under a load.

As is mentioned above, the process according to the present invention for producing a water-absorbent resin is characterized by comprising the step of polymerizing at least one raw monomer component including acrylic acid and/or its salt as major components wherein the protoanemonin content (favorably also the furfural content, more favorably also the total of both contents) of the acrylic acid is not more than 10 ppm, or by further comprising the step of subjecting the acrylic acid to the alkali treatment followed by the polymerization step wherein the acrylic acid contains an aldehyde. Therefore, hereinafter, a detailed explanation is first made about a process for producing the above raw acrylic acid and a process for obtaining the acrylic acid having a low furfural and/or protoanemonin content from acrylic acid.

Examples of known industrial processes for producing acrylic acid include a process of gas phase oxidation of propylene and/or propane, an ethylene cyanohydrin process, a high pressure Reppe process, an improved Reppe process, a ketene process, and an acrylonitrile hydrolysis process. Of them, the process of gas phase oxidation of propylene and/or propane is most commonly employed. Then, the present invention is favorably used for improvement on the process for producing a water-absorbent resin which involves the use of acrylic acid obtained by such a gas phase oxidation process. Incidentally, propane intrinsically behaves similarly to propylene, therefore hereinafter the above gas phase oxidation process is explained by citing propylene as a representative example.

The process of gas phase oxidation of propylene and/or propane is a process in which acrylic acid is obtained from propylene via acrolein by a catalytic gas phase oxidation process. The reaction is usually run through two steps using a diluent such as water vapor or inert gas. There are advantages in that the conversion of propylene is almost 100%, so the yield is high. In the propylene gas phase oxidation process, an acrylic acid solution is usually obtained by causing a solvent to absorb the resultant reaction gas. Examples of the solvent as used in this process include conventional solvents such as water, organic-acid-containing water, and inert hydrophobic organic liquids having high boiling points (for example, diphenyl ether, diphenyl). This acrylic acid solution contains a large quantity of solvent, which is therefore removed with a solvent-separating column to obtain desolvated acrylic acid. In this step, if the major component of the solvent is water, acrylic acid which is substantially free of water is obtained as a distillate from the distillation column by azeotropic distillation using a solvent which is azeotropic with water. Or if the major component of the solvent is the inert hydrophobic organic liquid having a high boiling point, acrylic acid which is substantially free of this solvent is obtained from a middle or top portion of the distillation column.

The above acrylic acid contains by-products and impurities, such as acetic acid, formaldehyde, acrolein, propionic acid, maleic acid, acetone, furfural, and benzaldehyde, and is therefore then purified to remove these by-products and impurities, and the resultant purified acrylic acid which is obtained in this step and substantially free of aldehydes is usually used as a raw material for water-absorbent resins (refer to such as JP-A-124546/1997).

However, according to the present inventors' experiences, even if the acrylic acid was purified in the above way, the properties of water-absorbent resins as obtained from the resultant purified acrylic acid were not always satisfactory.

Thus, the present inventors probed variously into its cause. As a result, they found that, as is aforementioned, this purified acrylic acid contains impurities referred to as furfural and/or protoanemonin, and that these impurities have a bad influence on water absorption properties, and further that this bad influence is great particularly in the case where the acrylic acid-based polymer is a neutralized salt. That is to say, the present inventors found that conventional acrylic acid contains a large quantity of furfural and/or protoanemonin, and is, from this viewpoint, still too "crude acrylic acid" to use it as a raw material for the water-absorbent resin, and needs further purification.

Hereinafter referred to as superpurified acrylic acid is acrylic acid which is used as a raw material in the process according to the present invention for producing the water-absorbent resin, namely, acrylic acid of which the content of specific impurities has been reduced with attention directed to these specific impurities, in comparison with the aforementioned desolvated acrylic acid and further the purified acrylic acid as a purified product of this desolvated acrylic acid.

Thus, the present inventors did contrivance for a process for purifying the above acrylic acid in order to decrease the protoanemonin content, the furfural content, and the total of both contents of the acrylic acid, and probed deeply into relations of the protoanemonin and/or furfural content of the acrylic acid with the water absorption properties of the resulting acrylic acid-based polymer. As a result, they found that in the case where the acrylic acid-based polymer is a neutralized salt, the decrease of the protoanemonin content and favorably the furfural content and more favorably the total of both contents of acrylic acid (which is a raw material for the above acrylic acid-based polymer) into the range of 10 ppm provides better results with regard to the water absorption properties. That is to say, the present inventors found that the satisfactory results are provided by getting "superpurified acrylic acid" which has been purified more than conventional purified acrylic acid.

However, in the present invention, as a matter of course, if acrylic acid and/or its salt already have had the protoanemonin content (favorably also the furfural content, more favorably also the total of both contents) in the range of 10 ppm in the stage just after their production, this acrylic acid and/or its salt may be used, intactly without purification, for producing the water-absorbent resin.

The protoanemonin content (favorably also the furfural content, more favorably also the total of both contents) of acrylic acid enough to enhance the properties and performance of the water-absorbent resin is in the range of 10 ppm, favorably 0.01 to 5 ppm, more favorably 0.05 to 2 ppm, particularly favorably 0.1 to 1 ppm.

Incidentally, in the case where the below-mentioned strong-alkali treatment is carried out, the protoanemonin or furfural content is available even if it is more than 10 ppm and further even more than 20 ppm, but more decrease thereof is favorable.

Examples of purification methods to obtain the "superpurified acrylic acid", which has been purified more than the aforementioned "purified acrylic acid" which is conventionally used as raw acrylic acid, include distillation and crystallization of which the purifiability has been further enhanced. The rectification degree is, for example, enhanced by: in the case of the use of the distillation as the purification method, increasing the amount of hydrazine compound (e.g. hydrazine hydrate, phenylhydrazine, hydrazine sulfate, hydrazine hydrochloride) as added as an aldehyde-treating agent, or increasing the number of theoretical plates (for example, by 6 to 20 plates), or increasing the reflux ratio; and, in the case of the use of the crystallization as the purification method, increasing the number of times of the crystallization (for example, by 3 to 10 times). The distillation and the crystallization might be used in combination with each other. The superpurification which is carried out in the above way provides enablement for reduction of the protoanemonin content (favorably also the furfural content, more favorably also the total of both contents) of purified acrylic acid from a conventional level into the range of 10 ppm and for the use of the resultant purified acrylic acid for obtaining an excellent water-absorbent resin.

Separately from the above, it is also possible to reduce the protoanemonin content of acrylic acid into the range of 10 ppm by adding such as nitrogen oxides or nitrosobenzene to the desolvated acrylic acid and thereby removing protoanemonin (refer to JP-B-041614/1981).

In the first process according to the present invention, it is favorable to further carry out an alkali treatment after intentionally reducing the protoanemonin or furfural content in the above way. In other words, in the first process according to the present invention, it is favorable to use acrylic acid of which the protoanemonin content, more favorably, the furfural content as well, have been reduced by the alkali treatment, particularly, strong-alkali treatment. Its favorable modes are, for example, the following (1) to (3):

(1) A specific impurity is decreased, and then the strong-alkali treatment is carried out, and then the polymerization is carried out.

If the content of the specific impurity in acrylic acid is not more than 20 ppm, this acrylic acid is available for the production of the water-absorbent resin after being subjected to the above specific strong-alkali treatment. The content of the specific impurity in acrylic acid is reduced to favorably not more than 10 ppm, more favorably 5 ppm, still more favorably not more than 3 ppm, yet still more favorably not more than 2 ppm, particularly favorably not more than 1 ppm.

(2) A specific impurity is decreased, and then the alkali treatment is carried out, and then the polymerization is carried out.

In the case where the alkali treatment is carried out with a weak base or in a neutralization ratio of less than 100%, it is necessary to more decrease the impurity. The content of the specific impurity is reduced to not more than 10 ppm, more favorably not more than 5 ppm, still more favorably not more than 3 ppm, yet still more favorably not more than 2 ppm, particularly favorably not more than 1 ppm.

(3) A specific impurity is decreased, and then the polymerization is carried out without alkali treatment.

This is a process in which acrylic acid that is either substantially unneutralized or neutralized in an extremely small quantity (of not more than 30 mol %) is polymerized, and this process is commonly called "acid polymerization followed by neutralization. It has been found out by the present inventors that, in the case of such acid polymerization, the specific impurity needs to more strictly be controlled. The specific impurity is reduced to favorably 5 ppm, more favorably not more than 3 ppm, still more favorably not more than 2 ppm, particularly favorably not more than 1 ppm.

In the present invention, the strong-alkali treatment of acrylic acid is also favorably usable for a treatment of acrylic acid which contains an aldehyde such as furfural or benzaldehyde, particularly, furfural. That is to say, it has been known so far that the aldehyde which is an impurity of acrylic acid causes polymerization hindrance. However, it has been found out by the present inventors that the strong-alkali treatment according to the present invention greatly enhances the polymerizability of the aldehyde-containing acrylic acid as such giving a water-absorbent resin.

That is to say, in the second process according to the present invention, the above strong-alkali treatment enhances the polymerizability of acrylic acid as such giving a water-absorbent resin, and further enhances the properties and coloring, wherein the content of the aldehyde, particularly, furfural, in the acrylic acid is not less than 1 ppm, more favorably not less than 10 ppm, still more favorably in the range of 20 to 500 ppm, and, at its height, 100 to 400 ppm.

In the second process according to the present invention, it is favorable to subjecting the above aldehyde-containing acrylic acid to the alkali treatment, particularly, strong-alkali treatment with such as sodium hydroxide, favorably at the above temperature and for the above time, in a neutralization ratio of more than 100 mol %. It has been found out by the present inventors that the acrylic acid, which has been treated for the below-mentioned time and at the below-mentioned temperature in a neutralization ratio of more than 100 mol %, exhibits the enhanced polymerizability, and further, provides better results with regard to the properties. Specifically, the strong-alkali treatment according to the present invention is carried out in a neutralization ratio of favorably not less than 100 mol %, more favorably not less than 105 mol %, when the temperature is favorably not lower than 20° C., more favorably not lower than 30° C., particularly favorably not lower than 40° C., and when the time is favorably not shorter than 30 minutes, more favorably not shorter than 1 hour, still more favorably not shorter than 5 hours.

The alkali treatment, as referred to in the present invention, means a treatment in which acrylic acid to be treated is added to a large amount of alkali or combined with an alkali at once, and in which acrylic acid that contains the aforementioned impurities is treated at not lower than a certain temperature under alkaline conditions, particularly under strong alkaline conditions. The polymerization of acrylic acid is greatly promoted by such an alkali treatment. In addition, the above alkali treatment is applied essentially to the second process, but is similarly favorable for enhancements of the polymerizability of acrylic acid and the properties of the resulting water-absorbent resin in the first process as well.

Hereinafter, protoanemonin and/or furfural are referred to as specific impurities. In the alkali treatment, not less than 50 mol %, favorably not less than 60 mol %, more favorably not less than 65 mol %, particularly favorably not less than 70 mol %, of acrylic acid which will be polymerized is subjected to the alkali treatment.

In the first and second processes according to the present invention, examples of basic substances as used for the alkali treatment include (hydrogen)carbonate salts, alkaline-metal hydroxide portions, ammonia, and organic amines. However, for more enhancing the polymerizability and obtaining a water-absorbent resin having still higher properties, the strong-alkali treatment specifically with the alkaline-metal hydroxides such as sodium hydroxide, potassium hydroxide, and lithium hydroxide is favorable, and sodium hydroxide is particularly favorable. These alkali treatments are favorably carried out in a state where the neutralization ratio of acrylic acid is more than 100 mol %, in other words, in an alkali excess state, and examples thereof include: a process in which acrylic acid is gradually added to a certain amount of alkaline substance to go through a strong alkaline region; and a process in which the alkali treatment is carried out simultaneously with the neutralization by line-mixing acrylic acid and a strong alkali together. In addition, or otherwise, in a process in which an alkali is gradually added to a large excess of acrylic acid, acrylic acid always exists more than the alkali, therefore the neutralization ratio is less than 100%, and there is a possibility that the polymerizability might tend to be insufficient, and that weak bases (e.g. (hydrogen)carbonate salts) which are often used in general for neutralization of acrylic acid might also be insufficient to enhance the polymerizability following the alkali treatment.

In the alkali treatment, particularly, strong-alkali treatment, it is favorable that acrylic acid is treated so that an aqueous solution or dispersion having a concentration of 10 to 80 weight %, more favorably 20 to 60 weight %, still more favorably 30 to 50 weight %, will be formed. The time of such an alkali treatment, particularly that for achieving the neutralization ratio of more than 100 mol %, is fitly determined in the range of favorably 1 second to 48 hours, more favorably 1 minute to 36 hours, still more favorably 5 minutes to 24 hours, particularly favorably 30 minutes to 24 hours. In addition, the above alkali treatment may be carried out jointly with an alkali treatment in which acrylic acid is stored or aged in a high alkaline region, favorably in a neutralization ratio of not less than 100 mol %, more favorably not less than 105 mol %, for a long time, in particular, favorably not shorter than 10 hours, more favorably not shorter than 20 hours, particularly favorably not shorter than 40 hours.

The temperature of acrylic acid or its aqueous solution in the alkali treatment is kept favorably not lower than 20° C., more favorably not lower than 30° C., still more favorably not lower than 40° C., particularly favorably not lower than 50° C. As to the alkali treatment, in cases where the temperature is low and where no strong alkali is used and further where no neutralization is carried out, the polymerizability is so low that inferior results are also provided with regard to the properties even if the aforementioned superpurified acrylic acid is used. Furthermore, the alkali treatment is carried out in the presence of oxygen for stability, favorably, in a state where the aqueous acrylic acid (or salt) solution contains oxygen in the range of 0.5 to 20 ppm, more favorably 1 to 15 ppm, still more favorably 1.5 to 10 ppm. In the case where the oxygen content is low, there are problems of the stability of the monomer in the alkali treatment. The alkali treatment is carried out under an oxygen or air atmosphere, favorably, while oxygen or air is blown in or dragged in. Incidentally, the oxygen content is measurable with a dissolved oxygen meter.

In the present invention, the water-absorbent resin may be a water-absorbent resin obtained by a process in which acrylic acid and/or its salt is used as a monomer either intactly or after being esterified, but the former is preferable to the latter.

Examples of the acrylic acid-based polymer include: poly(acrylic acids) and neutralized poly(acrylic acids) (in which part (about 25 to about 95 mol %) or all of carboxyl groups are in salt form), which are obtained by polymerizing acrylic acid or its salts; and further, copolymers as obtained by copolymerizing the acrylic acid or its salts with, for example, water-soluble or hydrophobic unsaturated monomers such as methacrylic acid, maleic acid, maleic anhydride, fumaric acid, crotonic acid, itaconic acid, vinylsulfonic acid, 2-(meth)acrylamido-2-methylpropanesulfonic acid, (meth)acryloxyalkanesulfonic acid, and their alkaline metal salts and ammonium salts, and further, N-vinyl-2-pyrrolidone, N-vinylacetamide, (meth)acrylamide, N-isopropyl(meth)acrylamide, N,N-dimethyl(meth)acrylamide, 2-hydroxyethyl (meth)acrylate, methoxypolyethylene glycol (meth)acrylate, polyethylene glycol (meth)acrylate, isobutylene, and lauryl (meth)acrylate. In the present invention, when monomers other than acrylic acid are used, their amount is favorably not larger than 30 mol %, more favorably not larger than 10 mol %, of the total with acrylic acid and its salt which are used as the major components.

In the case where the aforementioned acrylic acid is used, a partially neutralized acrylic acid-based polymer is favorable as the acrylic acid-based polymer. In view of the properties, the partially neutralized acrylic acid-based polymer is favorably a polymer of which 50 to 95 mol %, more favorably 60 to 90 mol %, of the acrylic acid moieties are neutralized. Examples of the salt include alkaline metal salts, ammonium salts, and amine salts. However, metal salts, particularly, alkaline metal salts such as lithium salts, sodium salts, and potassium salts, are favorable. Of the alkaline metal salts, sodium salts and lithium salts are favorable. The neutralization may be carried out either to monomers before polymerization, or to the polymer during or after polymerization. Furthermore, the neutralization of the monomer and that of the polymer may be combined with each other. However, it is favorable to subject acrylic acid to the aforementioned alkali treatment.

In the process for obtaining the acrylic acid-based polymer, bulk polymerization or precipitation polymerization can be carried out. However, carried out favorably for the performance or the easiness of the polymerization control is aqueous solution polymerization or reversed-phase suspension polymerization in which the above monomer component is used in the form of its aqueous solution. Incidentally, the reversed-phase suspension polymerization is a polymerization method in which liquid drops of the aqueous monomer solution are dispersed into an inert hydrophobic solvent, and the aqueous solution polymerization is a polymerization method in which the aqueous monomer solution is polymerized directly without being dispersed into the inert solvent. Furthermore, these polymerization methods are carried out favorably under an atmosphere of an inert gas such as nitrogen or argon. In addition, the monomer component is used for polymerization after dissolved oxygen therein has sufficiently been displaced with the inert gas. The present invention is favorably applied to the aqueous solution polymerization which is of high productivity and gives high properties but has been found by the present inventors to greatly be influenced by protoanemonin, and the present invention is particularly favorable for the aqueous solution polymerization which conventionally involves difficulty in controlling the polymerization.

When the monomer component is used in the form of its aqueous solution in the above reversed-phase suspension polymerization or aqueous solution polymerization, the concentration of the monomer component in this aqueous solution (hereinafter referred to as "aqueous monomer solution") is not especially limited, but is in the range of favorably 10 to 70 weight %, more favorably 15 to 65 weight %, still more favorably 30 to 45 weight %, in view of the resulting properties. In addition, when the above aqueous solution polymerization or reversed-phase suspension polymerization is carried out, a solvent other than water may be used jointly therewith if necessary, and the kind of this solvent as jointly used is not especially limited.

When the above aqueous monomer solution is polymerized, at least one of the following polymerization initiators, for example, can be used: such as potassium persulfate, ammonium persulfate, sodium persulfate, t-butyl hydroperoxide, hydrogen peroxide, 2,2'-azobis(2-amidinopropane) dihydrochloride, 2-hydroxy-1-phenylpropan-1-one, and benzoin methyl ether.

Furthermore, a redox initiator is also available by using the above polymerization initiator jointly with a reducing agent which promotes decomposition of the above polymerization initiator and thus combining both with each other. Examples of the above reducing agent include: (bi)sulfurous acid (or its salts) such as sodium sulfite and sodium hydrogensulfite; L-ascorbic acid (or its salts); reducible metals (or their salts) such as ferrous salts; and amines. However, the reducing agent is not especially limited. That is to say, the process according to the present invention exhibits great effects on aqueous solution polymerization involving the use of radical polymerization initiators and/or ultraviolet polymerization initiators, and exhibits greater effects when the polymerization initiation temperature is in the range of 0 to 70° C., favorably 10 to 60° C., more favorably 20 to 50° C., so the process according to the present invention is favorably used for such a polymerization method.

The amount of the above polymerization initiator or reducing agent as used is usually in the range of 0.001 to 2 mol %, favorably 0.01 to 0.5 mol %, of the monomer component. In the case where the amount of the polymerization initiator or reducing agent is smaller than 0.001 mol %, there are disadvantages in that a large amount of the monomer component remains unreacted, so the residual monomer content of the resultant acrylic acid-based polymer increases. On the other hand, in the case where the amount of the polymerization initiator or reducing agent is larger than 2 mol %, there are disadvantages in that the water-extractable content or coloring of the resultant acrylic acid-based polymer increases.

Incidentally, the polymerization reaction may be carried out either by irradiating the reaction system with active energy rays, such as radiations, electron beams, and ultraviolet rays, instead of using the above polymerization initiator, or by the joint use of these active energy rays with an ultraviolet polymerization initiator or the above polymerization initiator. Incidentally, the reaction temperature in the above polymerization reaction is not especially limited, but is in the range of favorably 15 to 130° C., more favorably 15 to 120° C., still more favorably 20 to 110° C., in terms of initiation temperature and peak temperature. In addition, whether continuously or batchwise or whether under static or stirred conditions the polymerization is carried out, or the reaction time or pressure, is not especially limited, either, and may fitly be set according to factors such as the respective kinds of the monomer component and polymerization initiator and the reaction temperature.

When the polymerization is carried out, the following materials may be added to the reaction system in an amount of 0 to 30 weight %, favorably 0 to 20 weight %: various foaming agents such as carbonate salts (or hydrogencarbonate salts), carbon dioxide, nitrogen, azo compounds, and inert organic solvents; hydrophilic polymers such as starch, cellulose, their derivatives, poly(vinyl alcohol), poly(acrylic acid) (or its salts), and crosslinked polymers of poly(acrylic acid) (or its salts); various surfactants; and chain transfer agents such as hypophosphorous acid (or its salts).

In the case where the aqueous solution polymerization is carried out, the resultant gel polymer is disintegrated into fine pieces, if necessary, and then favorably dried, and, if necessary, then pulverized or classified and further then granulated.

The extent of the above drying is as follows: the solid content of the resin as determined from its weight loss on the drying (by heating 1 g of powder at 180° C. for 3 hours) is usually not less than 80 weight % and, favorably for decomposing the aforementioned specific impurities by heating or in view of the properties of the resulting water-absorbent resin, not less than 85 weight %, more favorably not less than 90 weight %, particularly favorably not less than 93 weight %, further favorably in the range of 94 to 99 weight %. The drying temperature is not especially limited, but may be set, for example, in the range of 100 to 300° C., favorably 150 to 250° C. In addition, the drying time is not especially limited, but leaving the polymer alone for a long time might bring about its coloring, so the polymer is dried to the above solid content in as short a time as possible, favorably within 5 hours, more favorably within 3 hours, particularly favorably within 1 hour, after the polymerization. Examples of usable drying methods include various methods such as: heat-drying; hot-air drying; vacuum drying; infrared drying; microwave drying; drum drier drying; dehydration by azeotropy with hydrophobic organic solvents; and high-moisture drying by high-temperature steaming. The drying method is therefore not especially limited, but the hot-air drying and the high-moisture drying are more favorable.

The shape of the water-absorbent resin as obtained in the present invention is not especially limited, but examples thereof include: powdery shapes such as irregular pulverized shapes and spherical shapes; and gel shapes, sheet shapes, bar shapes, fibrous shapes, and filmy shapes. In addition, the resin may be combined with or carried on materials such as fibrous materials.

In the case where the water-absorbent resin is powdery, the weight-average particle diameter thereof is usually in the range of 10 to 2,000 μm and, favorably in view of the properties, in the range of 100 to 1,000 μm, more favorably 200 to 600 μm. And further, the content of fine particles not larger than 150 μm is favorably as low as possible, more favorably not higher than 10 weight %, still more favorably not higher than 5 weight %. Substantially the upper limit of the particle diameter is not larger than 850 μm, and the content of particles with particle diameters of 300 to 850 μm is favorably not lower than 50 weight %, more favorably not lower than 70 weight %, particularly favorably not lower than 80 weight %.

Incidentally, the water-absorbent resin as referred to in the present invention is a hydrophilic resin which has been rendered water-swellable and water-insoluble by introducing a crosslinked structure into the polymer, and is typically obtained by polymerizing and crosslinking the monomer component and, without load, absorbs 10 to 3,000 times as large a quantity of water as its own weight in ion-exchanged water and 5 to 200 times, favorably 20 to 100 times, as large a quantity of water as its own weight in a physiological saline solution, thereby forming a water-insoluble hydrogel. In addition, examples of the above water-absorbent resin include those which have a water-extractable content of not more than 25 weight %, favorably not more than 15 weight %, more favorably not more than 10 weight %, and are therefore substantially water-insoluble. The methods for measuring these properties are herein specified in the description of the examples of some preferred embodiments according to the present invention.

The crosslinking method as used is not especially limited, but examples thereof include: (A) a method which involves the steps of obtaining a hydrophilic polymer by polymerization of acrylic acid and/or its salt or, if necessary, copolymerization thereof with the above water-soluble or hydrophobic unsaturated monomers, and then adding a crosslinking agent to the resultant hydrophilic polymer during or after the polymerization, thereby post-crosslinking the hydrophilic polymer; (B) a method which involves radical crosslinking with radical polymerization initiators; and (C) a method which involves radiation crosslinking by utilizing such as electron beams. However, a favorable one is (D) a method which involves the steps of beforehand adding a predetermined amount of internal-crosslinking agent to acrylic acid and/or its salt or to the above water-soluble or hydrophobic unsaturated monomers as comonomers, and then carrying out polymerization simultaneously with or after which a crosslinking reaction is carried out. As a matter of course, the crosslinking method (D) may be employed jointly with the crosslinking methods (A) to (C).

Examples of the internal-crosslinking agent, as used in the above method (D), include N,N'-methylenebisacrylamide, (poly)ethylene glycol di(meth)acrylate, (poly)propylene glycol di(meth)acrylate, (polyoxyethylene) trimethylolpropane tri(meth)acrylate, trimethylolpropane di(meth)acrylate, polyethylene glycol di(β-acryloyloxypropionate), trimethylolpropane tri(β-acryloyloxypropionate), poly(meth)allyloxyalkanes, polyethylene glycol diglycidyl ether, ethylene glycol, polyethylene glycol, and glycerol. These internal-crosslinking agents may be used either alone respectively or in combinations with each other. Incidentally, when at least one internal-crosslinking agent is used, it is favorable in consideration of, for example, the absorption properties of the resultant water-absorbent resin that a compound with at least two polymerizable unsaturated groups is used essentially during the polymerization.

The amount of the above internal-crosslinking agent as used is favorably in the range of 0.005 to 2 mol %, more favorably 0.01 to 1 mol %, still more favorably 0.05 to 0.2 mol %, of the monomer component. In the case where the amount of the internal-crosslinking agent is smaller than 0.005 mol % or larger than 2 mol %, the desired absorption properties might not be obtained.

The water-absorbent resin obtained by the process according to the present invention may be a surface-crosslinked one, which is particularly favorable as a water-absorbent resin. The water-absorbent resin according to the present invention has so low a water-extractable content and so high an absorption capacity that excellent surface-crosslinking effects are made on this water-absorbent resin, which therefore can display still higher properties and performance.

Herein, the "surface-crosslinking" means further forming a portion having high crosslinking density in a surface layer of the resin besides a uniformly crosslinked structure inside the resin, and is carried out with the below-mentioned surface-crosslinking agent. The surface-crosslinking may be done by coating or impregnating the surface of the resin with the surface-crosslinking agent. The water absorption capacity of the resin under a load is enhanced by surface-crosslinking the resin. The water-absorbent resin according to the present invention has a water absorption capacity of not less than 20 g/g for a physiological saline solution under a load (50 g/cm$^2$, corresponding to about 4.90 kPa). After the surface-crosslinking of the water-absorbent resin, its water absorption capacity under the load is usually not less than 20 g/g, favorably not less than 23 g/g, more favorably not less than 25 g/g. In addition, the process according to the present invention provides enablement for easy and stable production of a water-absorbent resin having high properties such that the absorption capacity for a physiological saline solution under a load (20 g/cm$^2$, corresponding to about 1.96 kPa) is also usually not less than 20 g/g, favorably not less than 25 g/g, more favorably not less than 28 g/g, particularly favorably not less than 32 g/g, and that the water absorption capacity without load is also not less than 25 g/g, more favorably not less than 28 g/g, particularly favorably not less than 32 g/g. In addition, the liquid permeation quantity under a load is not less than 100 g/g, favorably not less than 300 g/g, more favorably not less than 500 g/g. Incidentally, the methods for measuring these properties are herein specified in the description of the examples of some preferred embodiments according to the present invention.

Various crosslinking agents are usable for carrying out the above surface-crosslinking. However, from the viewpoint of the properties and coloring, examples thereof as generally used include: polyhydric alcohol compounds; epoxy compounds; polyamine compounds; condensation products from haloepoxy compounds and the polyamine compounds; oxazoline compounds; mono-, di-, or polyoxazolidinone compounds; polyvalent metal salts; and alkylene carbonate compounds. Of these crosslinking agents, at least the polyhydric alcohols are used favorably for maximizing the effects of the present invention, and polyhydric alcohols having 2 to 10 carbon atoms, favorably 3 to 8 carbon atoms, are used. Examples of the crosslinking agent include: polyhydric alcohol compounds such as ethylene glycol, diethylene glycol, propylene glycol, triethylene glycol, tetraethylene glycol, polyethylene glycol, dipropylene glycol, polypropylene glycol, 1,3-propanediol, 2,2,4-trimethyl-1,3-pentanediol, glycerol, diglycerol, polyglycerol, 2-butene-1,4-diol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol; polyamidoamines, their epichlorohydrin addition products, 2-oxazolidinone, 1,3-dioxolan-2-one, 4-methyl-1,3-dioxolan-2-one, ethylene glycol diglycidyl ether, and aluminum salts. The amount of the surface-crosslinking agent as used depends upon factors such as types of the compounds as used or combinations thereof, but is favorably in the range of 0.001 to 10 weight parts, more favorably 0.01 to 5 weight parts, per 100 weight parts of the solid content of the resin.

In the present invention, water is favorably used for the surface-crosslinking. The amount of water, as used on this occasion, depends upon the water content of the water-absorbent resin as used, but is usually in the range of 0.5 to 20 weight parts, favorably 0.5 to 10 weight parts, per 100 weight parts of the water-absorbent resin. In addition, in the present invention, a hydrophilic organic solvent may be used besides water. The amount of the hydrophilic organic solvent is in the range of 0 to 10 weight parts, favorably 0 to 5 weight parts, more favorably 0 to 3 weight parts, relative to the water-absorbent resin. The temperature of the crosslinking agent solution is set in the range of 0° C. to boiling point, favorably 5 to 50° C., more favorably 10 to 30° C., from the viewpoint of the mixability and stability. In addition, before mixing, the temperature of the water-absorbent resin powder is favorably in the range of 0 to 80° C., more favorably 40 to 70° C., from the viewpoint of the mixability. Furthermore, in the present invention, favorable of various mixing methods is a method comprising the steps of premixing the surface-crosslinking agent with water and/or the hydrophilic organic solvent, if necessary, and then spraying or dropwise adding (preferably, spraying) the resultant aqueous solution to the water-absorbent resin to mix them together. The size of liquid droplets as sprayed is favorably not larger than 300 μm, more favorably not larger than 200 μm. In addition, in the mixing step, there may coexist water-insoluble finely-particulate powders or surfactants within the range not damaging the effects of the present invention.

A favorable mixing apparatus as used for the aforementioned mixing step needs to be able to generate great mixing power to ensure homogeneous mixing. Favorable examples of the mixing apparatus, usable in the present invention, include cylinder type mixers, double-wall cone type mixers, high-speed agitation type mixers, V-character-shaped mixers, ribbon type mixers, screw type mixers, fluidized-furnace rotary disk type mixers, air blow type (pneumatic type) mixers, twin-arm kneaders, internal mixers, pulverizing type kneaders, rotary mixers, and screw type extruders.

The water-absorbent resin and the surface-crosslinking agent are mixed together in the above way (if necessary, the heating treatment is then carried out) in order to crosslink the vicinity of the surface of the resin, thus obtaining a water-absorbent resin favorably having an absorption capacity of not less than 20 g/g for a physiological saline solution under a load of 50 g/cm$^2$ (about 4.90 kPa) or an absorption capacity of not less than 25 g/g for a physiological saline solution under a load of about 1.96 kPa. As to conditions for carrying out the above heating treatment, the heating temperature is favorably in the range of 100 to 250° C., more favorably 150 to 250° C. The heating time is favorably in the range of 1 minute to 2 hours. Favorable examples of combinations of the temperature and time include: 180° C., 0.1 to 1.5 hours; and 200° C., 0.1 to 1 hour. The heating treatment can be carried out by using conventional dryers or heating-furnaces. Examples of the dryers include channel type blending dryers, rotary dryers, disk dryers, fluidized-bed dryers, air blow type (pneumatic type) dryers, and infrared dryers.

In the above surface-crosslinking, the adjustment of the surface-crosslinking agent or the heating treatment conditions (such as temperature and time) can give an absorption capacity of not less than 20 g/g under a load (=about 4.90 kPa) or an absorption capacity of not less than 25 g/g under a load (=about 1.96 kPa), and further, an absorption capacity of favorably not less than 25 g/g without load.

It is also possible to give various functions to the water-absorbent resin (as obtained by the process according to the present invention) by further adding thereto materials such as deodorants, antimicrobial agents, perfumes, various inorganic or organic powders, foaming agents, pigments, dyes, hydrophilic short fibers, manure, oxidants, reducing agents, chelating agents, water, salts, various hydrophilic resins other than the poly(acrylic acids) composing the water-absorbent resin according to the present invention, and various hydrophobic resins, if necessary. The amount of these additives is fitly set according to purposes, but is, for example, in the range of 0.001 to 400 weight %, favorably 0.005 to 10 weight %, more favorably 0.01 to 1 weight %, of the water-absorbent resin.

The process according to the present invention provides enablement for easy production of a water-absorbent resin having good absorption properties in excellent balance between the absorption capacity without load, the absorption capacity under a load, and the extractable content. The resulting water-absorbent resin is widely used for such as agricultural and horticultural water-retaining agents, industrial water-retaining agents, humidity-absorbing agents, dehumidifying agents, and building materials, but its water-absorbing agent is particularly favorably used for sanitary materials such as disposable diapers and sanitary napkins. Furthermore, the water-absorbent resin according to the present invention is so excellent with regard to the above three properties in good balance that the sanitary materials are generally usable in a high concentration as a water-absorbent resin concentration (weight ratio of the water-absorbent resin to the total of the water-absorbent resin and fibrous materials), for example, of 30 to 100 weight %, favorably 40 to 100 weight %, more favorably 50 to 95 weight %.

(Effects and Advantages of the Invention):

The novel process according to the present invention for producing a water-absorbent resin gives a water-absorbent resin of which the residual monomer content and the water-extractable content are both low. Therefore, this water-absorbent resin displays excellent water absorbency.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited thereto.

(Production of Acrylic Acid and Acrylate Salt):

PRODUCTION EXAMPLE 1

A reaction gas, as obtained by gas phase oxidation of propylene, was collected into water in an absorption column to obtain an aqueous acrylic acid solution. Next, this aqueous acrylic acid solution was supplied into a solvent-separating column to distil off water and low boiling point impurities such as acetic acid with an azeotropic solvent, thus obtaining crude acrylic acid which had a protoanemonin content of 250 ppm and a furfural content of 260 ppm.

This crude acrylic acid was supplied into the column bottom of a high boiling point impurities-separating column having fifty dual-flow perforated plates, and then distilled in a reflux ratio of 1 to remove protoanemonin together with high boiling point impurities such as maleic acid and a dimer of acrylic acid (acrylic acid dimer). As a result, furfural-containing acrylic acid having a protoanemonin content of 1 ppm and a furfural content of 240 ppm was obtained from the column top.

Next, to this acrylic acid, hydrazine hydrate was added as an aldehyde-treating agent in a ratio of 400 ppm to distil the resultant mixture with a simple distiller, thus obtaining superpurified acrylic acid (1) of which the furfural content had been diminished to 1 ppm (protoanemonin content=1 ppm).

Then, this superpurified acrylic acid was subjected to an alkali treatment in the below-mentioned way, thereby obtaining a raw acrylate salt in the form of an aqueous solution.

A distillation flask as equipped with a stirrer was charged with 2,744 g of ion-exchanged water under an air atmosphere. Then, while the temperature of the neutralization reaction system in the flask was maintained in the range of 20 to 40° C. under stirred conditions, 1,390 g of superpurified acrylic acid (1) and 1,480 g of 48 weight % aqueous sodium hydroxide solution were dropwise added into this flask in a dropwise addition ratio of sodium hydroxide/acrylic acid=0.9 to 0.95 over a period of 100 minutes at the same time as each other. After the completion of this dropwise addition, 160 g of 48 weight % aqueous sodium hydroxide solution was further supplied into the flask to adjust the neutralization ratio of the neutralization reaction system in the flask to 102 mol %. Then, the temperature of the neutralization reaction system was adjusted to 40° C. to age the reaction mixture for 30 minutes. After the completion of this aging, 499 g of acrylic acid was supplied to the neutralization reaction system over a period of 10 minutes, thus obtaining an aqueous sodium acrylate solution having a neutralization ratio of 75 mol % and a concentration of 37 weight % (protoanemonin content=1 ppm, furfural content=1 ppm, both in the raw acrylic acid). Incidentally, the dissolved oxygen content was 8 ppm.

Incidentally, the protoanemonin content and the furfural content were analyzed by gas chromatography.

PRODUCTION EXAMPLE 2

Superpurified acrylic acid (2) of which the furfural content had been diminished to 1 ppm (protoanemonin content=3 ppm) was obtained in the same way as of Production Example 1 except that the number of the dual-flow perforated plates and the reflux ratio in the high boiling point impurities-separating column were changed to 40 and 1.5 respectively.

PRODUCTION EXAMPLE 3

Superpurified acrylic acid (3) of which the furfural content had been diminished to 1 ppm (protoanemonin content=9 ppm) was obtained in the same way as of Production Example 1 except that the number of the dual-flow perforated plates and the reflux ratio in the high boiling point impurities-separating column were changed to 40 and 1 respectively.

COMPARATIVE PRODUCTION EXAMPLE 1

Purified acrylic acid (4) of which the furfural content had been diminished to 1 ppm (protoanemonin content=30 ppm) was obtained in the same way as of Production Example 1 except that the number of the dual-flow perforated plates and the reflux ratio in the high boiling point impurities-separating column were changed to 20 and 2 respectively.

COMPARATIVE PRODUCTION EXAMPLE 2

Purified acrylic acid (5) of which the furfural content had been diminished to 1 ppm (protoanemonin content=13 ppm) was obtained in the same way as of Production Example 1 except that the number of the dual-flow perforated plates in the high boiling point impurities-separating column was changed to 30.

COMPARATIVE PRODUCTION EXAMPLE 3

Purified acrylic acid (6) of which the furfural content had been diminished to 1 ppm (protoanemonin content=17 ppm) was obtained in the same way as of Production Example 1 except that the number of the dual-flow perforated plates and the reflux ratio in the high boiling point impurities-separating column were changed to 30 and 0.9 respectively.

COMPARATIVE PRODUCTION EXAMPLE 4

Purification was attempted by carrying out simple distillation in the same way as of Production Example 1 except that no hydrazine hydrate was added to the crude acrylic acid (protoanemonin content=1 ppm, furfural content=240 ppm) as obtained from the column top of the high boiling point impurities-separating column. However, the resultant purified acrylic acid (7) had a furfural content of 230 ppm and a protoanemonin content of 1 ppm.

(Production of Water-Absorbent Resins):

Water-absorbent resins were produced in the below-mentioned way using the above-obtained various raw acrylate salts (aqueous sodium acrylate solutions).

EXAMPLE 1

First, trimethylolpropane triacrylate was dissolved as an internal-crosslinking agent in a ratio of 0.05 mol % (to the monomer) into 7,700 g of the aqueous sodium acrylate solution (protoanemonin content=1 ppm, furfural content=1 ppm, both in the raw acrylic acid) as obtained in the way of Production Example 1. As a result, an aqueous water-soluble unsaturated monomer solution (aqueous monomer solution (1)) (concentration=37%, neutralization ratio=75 mol %) was obtained.

This aqueous water-soluble unsaturated monomer solution was deaerated with nitrogen gas for 30 minutes (so that the dissolved oxygen content would be reduced to less than 0.5 ppm) and then supplied into a reactor as prepared by lidding a jacketed stainless-steel-made twin-arm kneader of 10 liters in capacity having two sigma type blades. While the aqueous water-soluble unsaturated monomer solution was maintained at 25° C., the internal air of the reaction system was displaced with nitrogen. Next, while the reactor was heated by passing warm water of 25° C. through the jacket, potassium persulfate of the ratio of 0.12 mol % (to 1 mol of the monomer) and L-ascorbic acid of the ratio of 0.005 g/mol (to 1 mol of the monomer) were added as a polymerization initiator into the reactor, and then the resultant mixture was stirred.

As a result, after 5 minutes from the addition of the polymerization initiator, polymerization started, and after 23 minutes, the reaction system reached its peak temperature, when the resultant hydrogel polymer was finely divided into diameters of not larger than 5 mm. Thereafter, the agitation was further continued to age the polymer for 20 minutes, and then the crosslinked hydrogel polymer (1) was got out. Next, the resultant finely particulate hydrogel polymer was spread onto a metal gauze of 50 meshes (mesh opening size=300 μm) and then dried at 150° C. with hot air for 3 hours. Then, the resultant dried product was pulverized with a vibration mill and further then classified into portions passing through a JIS standard sieve of 850 μm, thus obtaining a water-absorbent resin powder (1) having an average particle diameter of about 420 μm, in which the content of particles with particle diameters of not larger than 150 μm was 3 weight %.

EXAMPLE 2

First, 1,418 g of the superpurified acrylic acid (2) (protoanemonin content=3 ppm, furfural content=1 ppm) as obtained in Production Example 2 was dissolved into 1,944 g of ion-exchanged water. Next, while the resultant solution was stirred in the range of 20 to 40° C. in a cooled flask, thereto 1,640 g of 48 weight % aqueous sodium hydroxide solution was dropwise added under an air atmosphere over a period of 2 hours, thus obtaining a 37 weight % aqueous sodium acrylate solution (neutralization ratio=100%, dissolved oxygen content=6 ppm). Next, 1,611 g of this aqueous sodium acrylate solution (protoanemonin content=3 ppm, furfural content=1 ppm, both in the raw acrylic acid) and 184 g of the superpurified acrylic acid (2) (protoanemonin content=3 ppm, furfural content=1 ppm), as obtained in Production Example 2, were sufficiently mixed with polyethylene glycol diacrylate (average molecular weight=478) of the ratio of 0.10 mol % (to the monomers) as a crosslinking agent and 186 g of water, thus obtaining an aqueous monomer solution (2).

The resultant aqueous solution was injected into a stainless vat (length=320 mm, width=220 mm, and height=50 mm) of which the internal surface had been coated with Teflon. In this stage, the resultant thickness of the injected aqueous solution was 25 mm. Then, dissolved oxygen was removed from this solution to less than 0.5 ppm by introducing nitrogen gas into the stainless vat while the temperature of the aqueous solution was adjusted to 25° C. by sealing the opening of the vat with a polyethylene film having a nitrogen-introducing inlet, an exhaust outlet, and a polymerization initiator-adding inlet, and then immersing the vat into a water bath of 25° C. Thereafter, nitrogen gas was introduced into the vat at an inflow rate of 6 L/min (108 cm/min) along a longitudinal direction of the vat, and exhaust gases were continuously discharged from the opposite side. Then, potassium persulfate of the ratio of 0.13 g/(mol of monomer) and L-ascorbic acid of the ratio of 0.001 g/(mol of monomer) were injected as a polymerization initiator into the vat, of which the contents were then sufficiently mixed together by stirring them with a magnetic stirrer. As a result, after 1 minute from the addition of the polymerization initiator, polymerization started, and after 8 minutes, the polymerization peak temperature of 96° C. was observed. Then, after this polymerization peak, aging was carried out for 20 minutes.

The resultant crosslinked hydrogel polymer (2) was pulverized with a meat chopper as fitted with dies of the aperture of 9.5 mm, and then dried at 170° C. for 60 minutes to obtain coarse particles. Thereafter they were further pulverized and then classified with JIS standard sieves of from 850 μm (upper limit) to 150 μm (lower limit), thus obtaining a water-absorbent resin powder (2) having an average particle diameter of about 500 μm.

COMPARATIVE EXAMPLE 1

A comparative water-absorbent resin powder (1) was obtained by carrying out an alkali treatment of acrylic acid in the same way as of Production Example 1 except to use the acrylic acid (protoanemonin content=30 ppm, furfural content=1 ppm) as obtained in Comparative Production Example 1, and then carrying out the same procedure as of Example 1.

COMPARATIVE EXAMPLE 2

A comparative water-absorbent resin powder (2) was obtained in the same way as of Example 2 except to use the acrylic acid (protoanemonin content=13 ppm, furfural content=1 ppm) as obtained in Comparative Production Example 2.

Shown in Table 1 are the results of the measurement of the water absorption capacity without load, the water-extractable content, and the residual monomer content for each of the water-absorbent resin powders as obtained in the above way.

From Table 1, the following would be understood. The water-absorbent resin powder (1) of Example 1, as obtained using the superpurified acrylic acid as a raw material of which the protoanemonin content had been decreased to not more than 10 ppm, has the same water absorption capacity, but much lower residual monomer content and much lower water-extractable content, when compared with the comparative water-absorbent resin powder (1) of Comparative Example 1 as obtained using the conventional acrylic acid (protoanemonin content=30 ppm, furfural content=1 ppm). The comparative water-absorbent resin powder (2) of Comparative Example 2, of which the raw acrylic acid had a protoanemonin content of 13 ppm and a furfural content of 1 ppm, is much inferior with regard to the residual monomer content and the water-extractable content when compared with the water-absorbent resin powder (2) (protoanemonin content=3 ppm, furfural content=1 ppm) as obtained under the same polymerization conditions.

EXAMPLE 3

A strong-alkali treatment was carried out in the temperature range of 20 to 25° C. for 1 hour by dropwise adding 180 g of the superpurified acrylic acid (1) (protoanemonin content=1 ppm, furfural content=1 ppm) (as obtained in Production Example 1) in sequence over a period of 1 hour to an aqueous alkali solution comprising 208.33 g of 48 weight % aqueous sodium hydroxide solution and 246.8 g of ion-exchanged water. As a result, an aqueous sodium acrylate solution (3) having a neutralization ratio of 100 mol % and a concentration of 37 weight % (dissolved oxygen content=6 ppm) was obtained.

An aqueous monomer solution (3) having a concentration of 35 weight % and a neutralization ratio of 75 mol % (alkali treatment ratio=75 mol %) was obtained by dissolving together 228.77 g of the aqueous sodium acrylate solution (as obtained by the above alkali treatment), 21.62 g of the superpurified acrylic acid (1), 51.06 g of ion-exchanged water, and polyethylene glycol diacrylate (average n=8) as a crosslinking agent in a ratio of 0.05 mol %. Next, while being kept at 20° C., this aqueous monomer solution (3) was deaerated with nitrogen gas till the dissolved oxygen content was reduced to less than 0.5 ppm. Thereafter, the aqueous monomer solution (3) was placed into a cylindrical polypropylene container having a capacity of about 500 ml wherein the polymerization container would be capped and thermally insulated in an adiabatic state under a nitrogen atmosphere. Then, a polymerization initiator, comprising a combination of an aqueous solution of sodium persulfate of the ratio of 0.12 g/mol (to the monomers) with an aqueous solution of L-ascorbic acid of the ratio of 0.008 g/mol (to the monomers), was added to the aqueous monomer solution (3).

As a result, 1 minute later than the addition of the above initiator, polymerization started (induction time=1 minute), and the temperature rose due to the heat of polymerization, and then 18.5 minutes later than the addition of the above initiator, the peak temperature temperature (100° C.) was observed. After this attainment to the peak temperature, aging was carried out for 10 minutes. The resultant crosslinked hydrogel polymer (3) was cut into pieces of the size of several millimeters, and then dried by heating with hot air of 170° C. for 30 minutes. Then, in the same way as of Example 1, the resultant dried product was pulverized and then classified, thus obtaining a water-absorbent resin powder (3). The results are shown in Table 1.

EXAMPLE 4

The alkali treatment and the preparation of an aqueous monomer solution were carried out in the same way as of Example 3 except that the superpurified acrylic acid (1) was replaced with the superpurified acrylic acid (2) (protoanemonin content=3 ppm, furfural content=1 ppm) as obtained in Production Example 2. Specifically, an aqueous monomer solution (4) having a concentration of 35 weight % and a neutralization ratio of 75 mol % was obtained by dissolving together an aqueous sodium acrylate solution (4) (as obtained by the above alkali treatment of the superpurified acrylic acid (2)), ion-exchanged water, the superpurified acrylic acid (2), and the crosslinking agent in the same way as of Example 3.

Thereafter, the aqueous monomer solution (4) was polymerized in the same way as of Example 3. As a result, 1.5 minutes later than the addition of the above initiator, polymerization started (induction time=1.5 minutes). The resultant crosslinked hydrogel polymer (4) was cut, dried, pulverized, and classified in the same way as of Example 3, thus obtaining a water-absorbent resin powder (4). The results are shown in Table 1.

EXAMPLE 5

The alkali treatment and the preparation of an aqueous monomer solution were carried out in the same way as of Example 3 except that the superpurified acrylic acid (1) was replaced with the superpurified acrylic acid (3) (protoanemonin content=9 ppm, furfural content=1 ppm) as obtained in Production Example 3. Specifically, an aqueous monomer solution (5) having a concentration of 35 weight % and a neutralization ratio of 75 mol % was obtained by dissolving together an aqueous sodium acrylate solution (5) (as obtained by the above alkali treatment of the superpurified acrylic acid (3)), ion-exchanged water, the superpurified acrylic acid (3), and the crosslinking agent in the same way as of Example 3.

Thereafter, the aqueous monomer solution (5) was polymerized in the same way as of Example 3. As a result, 1.5 minutes later than the addition of the above initiator, polymerization started (induction time=1.5 minutes). The resultant crosslinked hydrogel polymer (5) was cut, dried, pulverized, and classified in the same way as of Example 3, thus obtaining a water-absorbent resin powder (5). The results are shown in Table 1.

COMPARATIVE EXAMPLE 3

The alkali treatment and the preparation of an aqueous monomer solution were carried out in the same way as of Example 3 except that the superpurified acrylic acid (1) was replaced with the purified acrylic acid (6) (protoanemonin content=17 ppm, furfural content=1 ppm) as obtained in Comparative Production Example 3. Specifically, a comparative aqueous monomer solution (3) having a concentration of 35 weight % and a neutralization ratio of 75 mol % was obtained by dissolving together a comparative aqueous sodium acrylate solution (3) (as obtained by the above alkali treatment of the purified acrylic acid (6)), ion-exchanged water, the purified acrylic acid (6), and the crosslinking agent in the same way as of Example 4.

Thereafter, the aqueous monomer solution (3) was polymerized in the same way as of Example 3. As a result, 1.5 minutes later than the addition of the above initiator, polymerization started (induction time=1.5 minutes). The resultant comparative crosslinked hydrogel polymer (3) was cut, dried, pulverized, and classified in the same way as of Example 3, thus obtaining a comparative water-absorbent resin powder (3). The results are shown in Table 1.

COMPARATIVE EXAMPLE 4

An alkali treatment of the purified acrylic acid (6) (protoanemonin content=17 ppm, furfural content=1 ppm) was carried out in the same way as of Example 5 except that the sodium hydroxide was replaced with sodium carbonate. A comparative aqueous monomer solution (4) having a concentration of 35 weight % and a neutralization ratio of 75 mol % was obtained by dissolving together a comparative aqueous sodium acrylate solution (4) (as obtained by the above alkali treatment), the superpurified acrylic acid (2), and the crosslinking agent in the same way as of Example 4. Thereafter, this comparative aqueous monomer solution was added as an aqueous polymerization initiator solution in the same way as of Example 3, but no polymerization started.

COMPARATIVE EXAMPLE 5

A comparative aqueous monomer solution (5) having a neutralization ratio of 0 mol % and a concentration of 35 weight % and containing the crosslinking agent in a ratio of 0.05 mol % was obtained in the same way as of Example 5 except that the purified acrylic acid (6) (protoanemonin content=17 ppm, furfural content=1 ppm) was used for polymerization with the purified acrylic acid (6) being left as it was unneutralized without alkali treatment. Thereafter, this comparative aqueous monomer solution was added as an aqueous polymerization initiator solution in the same way as of Example 3, but no polymerization started.

EXAMPLE 6

An aqueous monomer solution (6) having a neutralization ratio of 0% and a concentration of 35 weight % and containing the crosslinking agent in a ratio of 0.05 mol % was obtained in the same way as of Comparative Example 5 except that the acrylic acid (6) (protoanemonin content=17 ppm, furfural content=1 ppm) was replaced with the acrylic acid (2) (protoanemonin content=3 ppm, furfural content=1 ppm). Thereafter, the crosslinking agent was dissolved into this aqueous monomer solution in the same way as of Example 3, and the resultant solution was added as an aqueous polymerization initiator solution in the same way as of Example 3, but, 6.5 minutes later, polymerization started, and the attainment to its peak needed 47 minutes. The resultant crosslinked hydrogel polymer (6) was cut into pieces of the size of about 1 mm, and then mixed with sodium carbonate powder so as to have a neutralization ratio of 75 mol %, and then dried, pulverized, and classified in the same way as of Example 3, thus obtaining a water-absorbent resin sin powder (6).

TABLE 1

| | Polymerization container | Protoanomonin content (ppm) | Polymerization peak Time (minutes) | Polymerization peak Temperature (° C.) | Water absorption capacity (g/g) without load | Water-extractable content (weight %) | Residual monomer (ppm) |
|---|---|---|---|---|---|---|---|
| Example 1 | Kneader | 1 | 23 | 78 | 33 | 5 | 280 |
| Comparative Example 1 | Kneader | 30 | 27 | 80 | 33 | 7 | 470 |
| Example 2 | Vat | 3 | 8 | 96 | 34 | 6 | 120 |
| Comparative Example 2 | Vat | 13 | 12 | 102 | 34 | 8 | 160 |
| Example 3 | Cylindrical container | 1 | 16 | 98 | 51 | 22 | 160 |
| Example 4 | Cylindrical container | 3 | 18 | 103 | 53 | 25 | 480 |
| Example 5 | Cylindrical container | 9 | 24 | 98 | 55 | 26 | 620 |
| Comparative Example 3 | Cylindrical container | 17 | 29 | 93 | 56 | 28 | 760 |
| Comparative | Cylindrical | 17 | Weak-alkali treatment/no polymerization | | | | |

TABLE 1-continued

| | Polymerization container | Protoanomonin content (ppm) | Polymerization peak | | Water absorption capacity (g/g) without load | Water-extractable content (weight %) | Residual monomer (ppm) |
|---|---|---|---|---|---|---|---|
| | | | Time (minutes) | Temperature (° C.) | | | |
| Example 4 | container | | | | | | |
| Comparative Example 5 | Cylindrical container | (Unneutralized) 17 | No alkali treatment/no polymerization | | | | |
| Example 6 | Cylindrical container | (Unneutralized) 3 | 47 | 104 | 54 | 10 | 980 |

As is understood from comparisons of Examples 3 to 5 with Comparative Examples 3 to 5 under the same polymerization conditions in Table 1, as the protoanemonin content increases from 1 ppm to 17 ppm, the polymerization time (time as needed till the peak) gets longer and the residual monomer content increases, and further, the water-extractable content greatly increases when compared with a small increase of the water absorption capacity, so the properties are relatively deteriorated. In addition, as is also understood from comparisons among Comparative Examples 3 to 5 and comparisons between Examples 2 and 6, it is understood that even if the same acrylic acid is used, the alkali treatment, particularly, strong-alkali treatment, greatly enhances the polymerizability.

Also shown in Table 1 are the times which passed until the polymerization peak temperatures were indicated in the polymerization processes to obtain the water-absorbent resin powders in the Examples and the Comparative Examples. As is clear from the results, in the cases where the polymerization was carried out using the acrylate salts having protoanemonin contents of more than 10 ppm, the delay of the polymerization was caused, and the rise of the polymerization peak temperature was also observed, and the control of the polymerization was also difficult.

The methods for measuring the properties and performance, as shown in Table 1, are as follows:

Water Absorption Capacity without Load:

First, 0.2 g of water-absorbent resin powder was uniformly placed into a nonwoven-fabric-made bag (60 mm×60 mm), and then the bag was immersed into a 0.9 weight % aqueous sodium chloride solution (physiological saline solution). Sixty minutes later, the bag was drawn up and then drained at 250 G (a centrifugal acceleration of 250×9.8 ms$^{-2}$) with a centrifuge for 3 minutes, and the resultant weight W1 (g) of the bag was then measured. On the other hand, the same procedure as the above was carried out without the water-absorbent resin powder, and the resultant weight W0 (g) of the bag was measured. Thus, the water absorption capacity (g/g) without load was calculated in accordance with the following equation:

water absorption capacity (g/g) without load=($W1$ (g)−$W0$ (g))/(weight (g) of water-absorbent resin powder).

Water-extractable Content and Residual Monomer Content:

First, 0.50 g of water-absorbent resin powder was dispersed into 1,000 g of deionized water and then stirred with a magnetic stirrer for 3 hours. Then, the resultant swollen gel was filtered off with a paper filter, when the resultant filtrate contained a water-soluble polymer (poly(sodium acrylate)) which had eluted from the water-absorbent resin powder. Thus, 50 g of the resultant filtrate was placed into a beaker of 100 ml. Then added to this filtrate were 1 ml of 0.1 N aqueous sodium hydroxide solution, 10 ml of N/200 aqueous methyl glycol chitosan solution, and 4 drops of 0.1% aqueous Toluidine Blue solution to carry out colloidal titration, thereby determining the water-extractable content (water-soluble polymer content) (weight % relative to the water-absorbent resin) of the water-absorbent resin powder.

Separately, the filtrate of the water-absorbent resin powder which had been stirred for 2 hours in die above way was UV-analyzed by liquid chromatography to also determine the residual monomer content (residual acrylic acid content) (ppm/water-absorbent resin powder) of the water-absorbent resin powder.

Next, the water-absorbent resin powders which had been treated by surface-crosslinking in the below-mentioned way was also evaluated by their performance.

EXAMPLE 7

An aqueous crosslinking agent solution comprising 1,4-butanediol/propylene glycol/water/isopropanol=0.32/0.50/2.73/0.45 (weight % based on water-absorbent resin powder) was mixed into 500 g of the water-absorbent resin powder (2) as obtained in Example 2, and the resultant mixture was heated under stirred conditions in a bath of the oil temperature of 210° C. for 45 minutes, thus obtaining a water-absorbent resin powder (7).

COMPARATIVE EXAMPLE 6

A comparative water-absorbent resin powder (6) was obtained by subjecting the comparative water-absorbent resin powder (2) of Comparative Example 2 to the same surface-crosslinking treatment as of Example 7.

EXAMPLE 8

A mixture liquid comprising ethylene glycol diglycidyl ether/propylene glycol/water=0.03/3/1 (weight % based on water-absorbent resin powder) was added by spraying to 500 g of the water-absorbent resin powder (1) as obtained in Example 1, and the resultant mixture was heated under stirred conditions in an oil bath for 30 minutes, thus obtaining a water-absorbent resin powder (8).

COMPARATIVE EXAMPLE 7

A comparative water-absorbent resin powder (7) was obtained by the same procedure as of Example 8 except to substitute the water-absorbent resin powder (1) as obtained in Comparative Example 1. The results are shown in Table 2.

EXAMPLE 9

A mixture liquid comprising ethylene glycol diglycidyl ether/propylene glycol/water=0.03/3/1 (weight % based on water-absorbent resin powder) was added by spraying to 500 g of the water-absorbent resin powder (3) as obtained in Example 3, and the resultant mixture was heated under stirred conditions in an oil bath for 35 minutes, thus obtaining a water-absorbent resin powder (9).

COMPARATIVE EXAMPLE 8

A comparative water-absorbent resin powder (8) was obtained by the same procedure as of Example 9 except to substitute the comparative water-absorbent resin powder (3) as obtained in Comparative Example 3. Incidentally, the comparative water-absorbent resin powder (3) agglomerated in the mixing step and adhered to the mixing machine more than the comparative water-absorbent resin powder (2). The results are shown in Table 2.

Shown in Table 2 are the results of the measurement of the water absorption capacity without load, the water absorption capacity under a load, and the liquid permeation quantity under a load for each of the above water-absorbent resin powders.

From Table 2, the following would be understood. In the case where surface-crosslinking is carried out, when compared with the water-absorbent resin of Comparative Example 6, the water-absorbent resin according to the present invention has almost the same absorption capacity, but a liquid permeation quantity under a load so greatly enhanced from 465 g to 525 g as to have high water absorption properties. In other words, high surface-crosslinking effects are made on the water-absorbent resin of Example 7 according to the present invention, for which the reason seems to be that the water-extractable content of the water-absorbent resin according to the present invention is greatly decreased.

The measurement methods for the data of Table 2 are as follows:

Water Absorption Capacity Under Load:

The water absorption capacity of the water-absorbent resin powder for physiological saline solution under a load of 50 g/cm$^2$ (about 4.90 kPa) or 20 g/cm$^2$ (about 1.96 kPa) was measured in accordance with the methods as disclosed in the working examples portions of EP 0885917, EP 0811636, and U.S. Pat. No. 6,207,772B, namely, in the following way.

An amount of 0.900 g of water-absorbent resin powder was allowed to absorb a physiological saline solution over a period of 60 minutes in a state where a load of 50 g/cm$^2$ (about 4.90 kPa) or 20 g/cm$^2$ (about 1.96 kPa) was uniformly applied to the water-absorbent resin powder, and then the weight W2 (g) of the absorbed physiological saline solution was measured with a balance. From this weight W2, the water absorption capacity (g/g) under the load was calculated in accordance with the following equation:

water absorption capacity (g/g) under load=($W2$ (g)/weight (g) of water-absorbent resin powder).

Liquid Permeation Quantity Under Load:

With a measurement apparatus of FIG. 1 used, 0.900 g of water-absorbent resin powder was put into a cell 41 and therein swollen with artificial urine (1) to measure the quantity of 0.69 weight % aqueous sodium chloride solution 33 passing through the resultant swollen gel 44 (mainly between particles thereof) over a period of 10 minutes under a load of 0.3 psi (about 2.07 kPa) as the liquid permeation quantity (g) under load.

The artificial urine (1), as used above, comprises 0.25 g of calcium chloride dihydrate, 2.0 g of potassium chloride, 0.50 g of magnesium chloride hexahydrate, 2.0 g of sodium sulfate, 0.85 g of ammonium dihydrogenphosphate, 0.15 g of diammonium hydrogenphosphate, and 994.25 g of pure water.

As to the above measurement apparatus, a glass tube 32 is inserted in a tank 31, and the lower end of this glass tube 32 is positioned so as to be maintained at the level of 5 cm above the bottom of the swollen gel 44 in the cell 41. The liquid 33 is supplied into the cell 41 through an L 34 having

TABLE 2

| | Surface-crosslinked water-absorbent resin powder | Water absorption capacity (g/g) without load | Water absorption capacity (g/g) under load (4.90 kPa/1.96 kPa) | Liquid permeation quantity (g) under load |
|---|---|---|---|---|
| Example 7 | Water-absorbent resin powder (7) | 26 | 24/26 | 525 |
| Comparative Example 6 | Comparative water-absorbent resin powder (6) | 26 | 24/26 | 465 |
| Example 8 | Water-absorbent resin powder (8) | 26 | 24/26 | — |
| Comparative Example 7 | Comparative water-absorbent resin powder (7) | 26 | 23/25 | — |
| Example 9 | Water-absorbent resin powder (9) | 42 | 25/38 | — |
| Comparative Example 8 | Comparative water-absorbent resin powder (8) | 40 | 22/35 | — |
| Example 16 | Water-absorbent resin powder (16) | 43 | 25/38 | — | a cock. Under the cell 41, a vessel 48 to collect the liquid which has passed through the swollen gel 44 is put on an even balance 49. The inner diameter of the cell 41 is 6 cm, and a No. 400 stainless metal gauze 42 (mesh opening size=38 μm) is set at the bottom of the cell 41. A pressing portion of a piston 46 has openings 47 of the size enough for the liquid 33 to pass through the openings 47, of which the bottoms are fitted with a filter 45 which has good permeability but through which the water-absorbent resin powder or the swollen gel thereof cannot enter the openings 47. The cell 41 is supported on a stand 43, of which the face contacting the cell 41 is a stainless metal gauze that does not hinder the permeation of the liquid.

The liquid permeation quantity (g) under load was determined by reading from the even balance 49 the quantity (g) of the liquid that flowed over a period of 10 minutes since opening the cock 35.

Needless to say, the larger the liquid permeation quantity (g) of the water-absorbent resin under load is, the greater is the degree such that the water-absorbent resin serves as an excellent water-absorbent resin which displays, even in diapers, so high liquid permeability as to cause little leakage and is therefore suitable also for diapers having high polymer concentration.

EXAMPLE 10

The purified acrylic acid (7) (furfural content=230 ppm) was subjected to a strong-alkali treatment. Specifically, an alkali treatment of acrylic acid was carried out in a neutralization ratio of 100 mol % in the kept liquid temperature range of 20 to 30° C. by dropwise adding 180 g of the acrylic acid (7) (furfural content=230 ppm) to an aqueous solution comprising 208.33 g of 48 weight % sodium hydroxide and 246.8 g of ion-exchanged water under an air atmosphere and under cooled conditions. An aqueous monomer solution (10) having a concentration of 35 weight % and a neutralization ratio of 75 mol % was obtained by dissolving together 228.77 g of aqueous sodium acrylate solution (10) (dissolved oxygen content=6 ppm) (as obtained by the above alkali treatment), 21.62 g of the superpurified acrylic acid (1), 51.06 g of ion-exchanged water, and polyethylene glycol diacrylate (average n=8) as a crosslinking agent in a ratio of 0.05 mol %.

Thereafter, the aqueous monomer solution (10) was polymerized in the same way as of Examples 3 to 8. As a result, 1.5 minutes later than the addition of the above initiator, polymerization started (induction time=0.5 minute). The resultant crosslinked hydrogel polymer (10) was cut, dried, pulverized, and classified in the same way as of Example 3, thus obtaining a water-absorbent resin powder (10). The results are shown in Table 3.

EXAMPLE 11

A strong-alkali treatment of acrylic acid was carried out in a neutralization ratio of 105 mol % in the temperature range of 20 to 30° C. in the same way as of Example 10 except that the amount of the acrylic acid as subjected to the alkali treatment was changed from 180 g to 171.36 g. Then, 8.64 g of the superpurified acrylic acid (1) of Production Example 1 was added to an aqueous sodium acrylate solution having a neutralization ratio of 105 mol % (as obtained in the above way), thus obtaining an aqueous sodium acrylate solution (11) having a concentration of 37 weight % and a neutralization ratio of 100 mol %.

Thereafter, this aqueous sodium acrylate solution (11) was used to obtain an aqueous monomer solution (11) in the same way as of Example 10, and then this aqueous monomer solution (11) was polymerized in the same way as of Example 10, and then the resultant crosslinked hydrogel polymer (11) was cut, dried, pulverized, and classified in the same way, thus obtaining a water-absorbent resin powder (11), which had a residual monomer content of 960 ppm. The results are shown in Table 3.

EXAMPLE 12

An alkali treatment was carried out for 16 hours in the same way as of Example 11 except that the obtained aqueous sodium acrylate solution having a neutralization ratio of 105 mol % (dissolved oxygen content=6 ppm) was further aged at room temperature under stirred conditions for 16 hours.

Then, 8.64 g of the superpurified acrylic acid (1) of Production Example 1 was added to an aqueous sodium acrylate solution having a neutralization ratio of 105 mol % (as obtained in the above way), thus obtaining an aqueous sodium acrylate solution (12) having a neutralization ratio of 100 mol %. Thereafter, an aqueous monomer solution (12) was obtained in the same way as of Example 11, and then polymerization was carried out in the same way, and then the resultant crosslinked hydrogel polymer (12) was cut, dried, pulverized, and classified in the same way, thus obtaining a water-absorbent resin powder (12). The results are shown in Table 3.

EXAMPLE 13

A strong-alkali treatment was carried out in the same way as of Example 11 except that the temperature range of the strong-alkali treatment, namely, the liquid temperature range of 20 to 30° C., was changed to the liquid temperature range of 40 to 50° C. Then, 8.64 g of the superpurified acrylic acid (1) of Production Example 1 was added to an aqueous sodium acrylate solution having a neutralization ratio of 105 mol % (as obtained in the above way), thus obtaining an aqueous sodium acrylate solution (13) having a neutralization ratio of 100 mol %. Thereafter, an aqueous monomer solution (13) was obtained in the same way as of Examples 11 to 12, and then polymerization was carried out in the same way, and then the resultant crosslinked hydrogel polymer (13) was cut, dried, pulverized, and classified in the same way, thus obtaining a water-absorbent resin powder (13). The results are shown in Table 3.

EXAMPLE 14

A strong-alkali treatment was carried out in the same way as of Example 13 except that, after the change of the temperature range of the strong-alkali treatment, namely, the liquid temperature range of 20 to 30° C., to the liquid temperature range of 40 to 50° C., aging was further carried out at room temperature under stirred conditions for 16 hours. Then, 8.64 g of the superpurified acrylic acid (1) of Production Example 1 was added to an aqueous sodium acrylate solution having a neutralization ratio of 105 mol % (as obtained in the above way), thus obtaining an aqueous sodium acrylate solution (14) having a neutralization ratio of 100 mol %. Thereafter, an aqueous monomer solution (14) was obtained in the same way as of Examples 11 to 13, and then polymerization was carried out in the same way, and then the resultant crosslinked hydrogel polymer (14) was cut, dried, pulverized, and classified in the same way, thus obtaining a water-absorbent resin powder (14), which had a residual monomer content of 740 ppm. The results are shown in Table 3.

EXAMPLE 15

An alkali treatment was carried out in the same way as of Example 12 except that the aging at room temperature under stirred conditions for 16 hours was replaced with aging at 50° C. for 16 hours. Then, 8.64 g of the superpurified acrylic acid (1) of Production Example 1 was added to an aqueous sodium acrylate solution having a neutralization ratio of 105 mol % (as obtained by the above alkali treatment at 50° C. for 16 hours), thus obtaining an aqueous sodium acrylate solution (15) having a neutralization ratio of 100 mol %.

ization ratio of 75 mol % and a concentration of 35 weight % was polymerized in the same way as of Example 10. However, it took not less than 5 minutes to initiate the polymerization, and further it took not less than 3 hours to attain the peak of the polymerization.

EXAMPLE 16

A mixture liquid comprising ethylene glycol diglycidyl ether/propylene glycol/water=0.1/3/1 (weight % based on water-absorbent resin powder) was added by spraying to 500 g of the water-absorbent resin powder (14) as obtained in Example 14, and the resultant mixture was heated under stirred conditions in an oil bath for 30 minutes, thus obtaining a water-absorbent resin powder (16). The results are shown in Table 2.

TABLE 3

|  | Strong-alkali treatment time (minutes) | Polymerization peak time (minutes)/ temperature (° C.) | Water absorption capacity (g/g) without load | Water-extractable content (weight %) | Color of resin |
|---|---|---|---|---|---|
| Example 10 | 100 mol % * 20–30° C. | 145/83 | 48 | 12 | Yellow |
| Example 11 | 105 mol % * 20–30° C. | 140/70 | 44 | 12 | Yellow |
| Example 12 | 105 mol % * 20–30° C. + rt. 16 hrs | 75/87 | 52 | 18 | Yellow |
| Example 13 | 105 mol % * 40–50° C. | 40/95 | 55 | 23 | Light yellow |
| Example 14 | 105 mol % * 40–50° C. + rt. 16 hrs | 37/99 | 65 | 23 | Light yellow |
| Example 15 | 105 mol % * 40–50° C. + 50° C. * 16 hrs | 22/104 | 57 | 24 | Light yellow |
| Comparative Example 9 | None | (It took not less than 5 minutes to initiate the polymerization.) | | | |
| Comparative Example 10 | Weak-alkali treatment | (It took not less than 5 minutes to initiate the polymerization.) | | | |

Thereafter, an aqueous monomer solution (15) was obtained in the same way as of Examples 11 to 14, and then polymerization was carried out in the same way, and then the resultant crosslinked hydrogel polymer (15) was cut, dried, pulverized, and classified in the same way, thus obtaining a water-absorbent resin powder (15), which had a residual monomer content of 460 ppm. The results are shown in Table 3.

COMPARATIVE EXAMPLE 9

Polymerization was carried out in the same way as of Example 10 except that what was polymerized was a comparative aqueous monomer solution (9) having a neutralization ratio of 0 mol % and a concentration of 29 weight % (corresponding to the same molar concentration as that in Example 10) which was obtained from the acrylic acid (furfural content=230 ppm) without alkali treatment. However, it took not less than 5 minutes to initiate the polymerization, and further it took not less than 3 hours to attain the peak of the polymerization.

COMPARATIVE EXAMPLE 10

An alkali treatment of the acrylic acid (furfural content=230 ppm) was carried out in the same way as of Example 10 except that the 48 weight % sodium hydroxide was replaced with sodium carbonate. The resultant comparative aqueous monomer solution (10) having a neutral- As is understood from Table 3, in the case where the acrylic acid having a furfural content of 230 ppm was not subjected to alkali treatment, the progress of the polymerization is so slow as not to be fit for the production (Comparative Examples 9 & 10).

On the other hand, in Examples 10 to 15 in which strong-alkali treatments were carried out, the polymerization runs in about 1 minute (it took 145 minutes to attain the peak in Example 10). Furthermore, if the temperature or neutralization ratio in the strong-alkali treatment is raised to prolong the time, then the polymerization time is greatly shortened (to 37 minutes in Example 14/to 22 minutes in Example 15), and the residual monomer content is also reduced, and, in Example 15, the polymerizability is exhibited to almost the same degree as acrylic acid having an aldehyde content of less than 10 ppm. Furthermore, as it goes on from Examples 10 to 15 in which the alkali treatment was more and more strengthened in this order, the water absorption capacity is also more and more enhanced, and coloring of the resultant water-absorbent resins is also more and more improved, and the properties resultant from the surface-crosslinking treatment are also more and more excellent as is shown in Table 2.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for producing a water-absorbent resin by polymerizing a monomer solution including acrylic acid and/or its salt as major components, where the acrylic acid is obtained by catalytic gas-phase oxidation of propylene and/or propane,
wherein the water-absorbent resin is a neutralized product salt having a neutralization ratio of not less than 50 mol % and has a crosslinked structure,
wherein the acrylic acid is neutralized and polymerized by at least one of steps (1), (2) or (3),
(1) acrylic acid containing protoanemonin of not more than 20 ppm is subjected to a strong-alkali treatment using an alkali-metal hydroxide to obtain an aqueous solution having a neutralization ratio of not less than 50 mol %, and then the polymerization of the solution is carried out,
(2) acrylic acid containing protoanemonin of not more than 10 ppm is subjected to an alkali treatment to obtain an aqueous solution having a neutralization ratio of not less than 50 mol %, and then the polymerization of the solution is carried out, wherein the alkali treatment is carried out by using a weak base or carried out by gradually adding strong base to an excess of acrylic acid under the condition of a neutralization ratio of less than 100 mol %,
(3) the polymerization of the solution of acrylic acid containing protoanemonin of not more than 5 ppm and having a neutralization ratio of 0 to 30 mol % is carried out, and then the obtained polymer is neutralized to obtain a neutralized product salt having a neutralization ratio of not less than 50 mol %.

2. A process according to claim 1, wherein the acrylic acid has a furfural content of not more than 10 ppm.

3. A process according to claim 1, wherein the acrylic acid is neutralized and polymerized by the step (1) or (2).

4. A process according to claim 1, wherein the alkali-treatment of the step (2) is a strong-alkali treatment using an alkali-metal hydroxide.

5. A process according to claim 1, wherein the polymerization is aqueous solution polymerization.

6. A process according to claim 1, which further comprises the step of crosslinking the vicinity of the surface of the water-absorbent resin.

7. A process according to claim 1, wherein the resultant water-absorbent resin has a water absorption capacity of not less than 25 g/g under a load of about 1.96 kPa.

8. A process according to claim 1, wherein the mixture of said acrylic acid and/or its salt and said alkali of the step (1) or (2) is a solution containing 0.5 to 20 ppm of oxygen.

9. A process according to claim 1, wherein acrylic acid is treated in the alkali treatment of the step (1) or (2) so that an aqueous solution or dispersion having a concentration of 10 to 80 weight % will be formed.

10. A process according to claim 1, wherein said water-absorbent resin has a weight-average particle diameter in the range of 200 μm to 600 μm, and has a content of fine particles not larger than 150 μm or not higher than 5 weight %.

11. A process according to claim 1, wherein said water-absorbent resin has a water extractable content of not more than 15 weight %.

12. A process according to claim 1, wherein said strong-alkali treatment of step (1) is carried out at a temperature of not lower than 40° C.

13. A process according to claim 1, wherein the strong-alkali treatment of the step (1) or the alkali treatment of the step (2) is carried out by the process where acrylic acid is gradually added to a certain amount of alkaline substance to go through a strong alkaline region, or the alkali treatment is carried out simultaneously with the neutralization by line-mixing acrylic acid and a strong alkali together.

14. A process according to claim 1, wherein the polymerization is carried out after the step of displacing dissolved oxygen from the solution with an inert gas.

15. A process according to claim 1, wherein the water-absorbent resin has a liquid permeation quantity of not less than 300 g/g under a load of about 2.07 kPa.

* * * * *